(12) United States Patent
Tuin et al.

(10) Patent No.: US 7,719,177 B2
(45) Date of Patent: May 18, 2010

(54) LOW-PRESSURE MERCURY VAPOR DISCHARGE LAMP AND COMPACT FLUORESCENT LAMP

(75) Inventors: Aafko Hendrik Tuin, Roosendaal (NL); Ingrid Jozef Maria Snijkers-Hendrickx, Eindhoven (NL); Ronald Arjan Van Den Brakel, Roosendaal (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 289 days.

(21) Appl. No.: 10/597,572

(22) PCT Filed: Feb. 2, 2005

(86) PCT No.: PCT/IB2005/050413
§ 371 (c)(1),
(2), (4) Date: Aug. 22, 2008

(87) PCT Pub. No.: WO2005/074011
PCT Pub. Date: Aug. 11, 2005

(65) Prior Publication Data
US 2008/0297024 A1    Dec. 4, 2008

(30) Foreign Application Priority Data
Feb. 2, 2004    (EP)  ................... 04100363

(51) Int. Cl.
*H01J 1/62*    (2006.01)

(52) U.S. Cl. .......................... 313/486; 313/487
(58) Field of Classification Search .......... 313/484–489
See application file for complete search history.

(56) References Cited

U.S. PATENT DOCUMENTS

| 2,331,306 | A | * | 10/1943 | Casellini | ...................... 313/487 |
| 3,377,494 | A | * | 4/1968 | Repsher | ...................... 313/489 |
| 4,447,756 | A | * | 5/1984 | Kohmoto et al. | ............ 313/487 |
| 7,004,812 | B2 | * | 2/2006 | Uegaki et al. | .................. 445/51 |

FOREIGN PATENT DOCUMENTS

JP    60047365 A   *   3/1985

* cited by examiner

*Primary Examiner*—Vip Patel
(74) *Attorney, Agent, or Firm*—Thorne & Halajian, LLP

(57) ABSTRACT

A low-pressure mercury vapor discharge lamp has a light-transmitting discharge vessel (10) enclosing, in a gastight manner, a discharge space (11) provided with a filling of mercury and a rare gas. The discharge vessel (10) comprises discharge means for maintaining a discharge in the discharge space (13). At least a part of an inner wall (12) of the discharge vessel (10) is provided with a protective layer (16). The discharge vessel (10) is provided with a luminescent layer (17) comprising a luminescent material. The luminescent layer (17) further comprises inorganic softening particles (27) with a softening point above 450° C. The size of the softening particles (27) is in the range from 0.01 to 10 gm. Preferably, the softening particles (27) are selected from the group formed by strontium borate, barium borate, yttrium borate, yttrium-strontium borate and calcium pyrophosphate.

17 Claims, 3 Drawing Sheets

LOW-PRESSURE MERCURY VAPOR DISCHARGE LAMP AND COMPACT FLUORESCENT LAMP

The invention relates to a low-pressure mercury vapor discharge lamp comprising a light-transmitting discharge vessel provided with a protective layer and a fluorescent layer.

The invention also relates to a compact fluorescent lamp.

In mercury vapor discharge lamps, mercury constitutes the primary component for the (efficient) generation of ultraviolet (UV) light. A luminescent layer comprising a luminescent material may be present on an inner wall of the discharge vessel to convert UV to other wavelengths, for example, to UV-B and UV-A for tanning purposes (sun panel lamps) or to visible radiation for general illumination purposes. Such discharge lamps are therefore also referred to as fluorescent lamps. Alternatively, the ultraviolet light generated may be used for manufacturing germicidal lamps (UV-C). The discharge vessel of low-pressure mercury vapor discharge lamps is usually circular and comprises both elongate and compact embodiments. Generally, the tubular discharge vessel of compact fluorescent lamps comprises a collection of relatively short straight parts having a relatively small diameter, which straight parts are connected together by means of bridge parts or via bent parts. Compact fluorescent lamps are usually provided with an (integrated) lamp cap. Normally, the means for maintaining a discharge in the discharge space are electrodes arranged in the discharge space. In an alternative embodiment the low-pressure mercury vapor discharge lamp comprises a so-called electrodeless low-pressure mercury vapor discharge lamp.

It is known that measures are taken in low-pressure mercury vapor discharge lamps to inhibit blackening of parts of the inner wall of the discharge vessel, which parts are in contact with a discharge which, during operation of the discharge lamp, is present in the discharge space. Such blackening, which is brought about by interaction between mercury and the glass from which the discharge vessel is made, is undesirable and does not only lead to a reduction of the maintenance but also to an unaesthetic appearance of the lamp, particularly because the blackening occurs irregularly, for example, in the form of dark stains or dots.

A low-pressure mercury vapor discharge lamp of the type described in the opening paragraph is known from International Application WO-A 01/56 350. In the known discharge lamp, the discharge vessel is made from a sodium-rich glass, the inner wall of the discharge vessel being provided with a protective layer comprising a borate or a phosphate of an alkaline-earth metal and/or of scandium, yttrium or another rare earth metal. A luminescent layer is provided on top of the protective layer in the discharge vessel. The known discharge lamp has an improved maintenance.

A drawback of the use of the known low-pressure mercury vapor discharge lamp is that the maintenance still is relatively poor. As a result, in addition, a relatively large amount of mercury is necessary for the known lamp in order to realize a sufficiently long service life. In the case of injudicious processing after the end of the service life, this is detrimental to the environment.

The invention has for its object to eliminate the above disadvantage wholly or partly. According to the invention, a low-pressure mercury vapor discharge lamp of the kind mentioned in the opening paragraph for this purpose comprises:

a light-transmitting discharge vessel enclosing, in a gastight manner, a discharge space provided with a filling of mercury and a rare gas, the discharge vessel comprising discharge means for maintaining a discharge in the discharge space, at least a part of an inner wall of the discharge vessel being provided with a protective layer, the discharge vessel being provided with a luminescent layer comprising a luminescent material, the luminescent layer further comprising inorganic softening particles with a softening point above 450° C., the size of the softening particles being in the range from 0.01 to 10 µm.

In a discharge vessel of a low-pressure mercury vapor discharge lamp according to the invention with a luminescent layer comprising inorganic softening particles with an average size smaller than 10 µm, a better adhesion of the fluorescent layer on the wall of the discharge vessel is obtained. The combination of a protective layer and the fluorescent layer with the softening particles appears to be very well resistant to the action of the mercury-rare gas atmosphere which, in operation, prevails in the discharge vessel of the low-pressure mercury vapor discharge lamp. As a result, blackening due to interaction between mercury and the glass from which the discharge vessel is manufactured is reduced, resulting in an improved maintenance. During the service life of the discharge lamp, a smaller quantity of mercury is withdrawn from the discharge, so that, in addition, a reduction of the mercury consumption of the discharge lamp is obtained and in the manufacture of the low-pressure mercury vapor discharge lamp a smaller mercury dose will suffice.

Blackening caused by withdrawing mercury from the discharge occurs in straight parts as well as arc-shaped parts of the low-pressure mercury vapor discharge lamp. In general, blackening is reduced by providing the inner wall of the discharge vessel with a sufficiently adherent and sufficiently thick protective layer. The application of a protective layer in combination with a luminescent layer comprising softening particles with an (average) size smaller than 10 µm according to the invention causes the adhesion of the luminescent layer to be substantially improved in the straight parts as well as the arc-shaped parts of the low-pressure mercury vapor discharge lamp and this consequently leads to an improved maintenance. In experiments it is observed that discharge vessels provided with alumina consume more mercury than discharge vessels with softening particles according to the invention.

The measure according to the invention is notably suitable for compact fluorescent lamps having arc-shaped lamp parts, wherein the discharge vessel is additionally surrounded by a light-transmitting envelope. The temperature of the discharge vessel of such "covered" compact fluorescent lamps is comparatively high because the heat dissipation to the environment is reduced by the presence of the envelope. This unfavorable temperature balance adversely affects the maintenance of the known discharge lamp due to an increased level of blackening; an influence already observed in early lamp life. In experiments it has surprisingly been found that the maintenance of a compact fluorescent lamp provided with a low-pressure mercury vapor discharge lamp according to the invention, the discharge vessel of which is surrounded by an envelope, exceeds % 98% after 500 burning hours, while the maintenance of an identical compact fluorescent lamp provided with the known low-pressure mercury vapor discharge lamp, the discharge vessel of which is surrounded by an envelope, is less than % 96% after 500 burning hours.

The addition of a (low melting) so-called frit glass into the luminescent layer for improving the bonding strength of a fluorescent layer to a discharge vessel of a low-pressure mercury vapor discharge lamp is known in the art. The use of relatively small softening particles, with an (average) size smaller than 10 μm, has the advantage that bonding of the fluorescent layer to the wall of the discharge vessel is improved.

Preferably, the size of the softening particles is in the range from 0.01 to 1 μm. By employing sub-micron softening particles, the concentration of the softening particles in the fluorescent layer can be relatively low.

Preferably, the inorganic softening particles comprise a melting point above 450° C. In this way, the adhesion is improved both the arc-shaped and strait parts of the vessel. In particular, for those lamps in which bended parts are formed subsequent to coating the fluorescent layer, a melting point of the softening particles around and above 600° C., improves the adhesion of the fluorescent layer in the arc-shaped parts of the discharge vessel. Other advantages are a lowered Hg consumption during life and an improved run-up of the low-pressure mercury vapor discharge lamp.

A preferred embodiment of the low-pressure mercury vapor discharge lamp according to the invention is characterized in that the softening particles comprise a borate and/or a phosphate of an alkaline earth metal and/or a borate and/or a phosphate of scandium, lanthanum, yttrium or a further rare earth metal. Such softening particles improve the bonding of the fluorescent layer to the glass wall or to pre-coat of the discharge vessel.

In a preferred embodiment of the low-pressure mercury vapor discharge lamp according to the invention, the softening particles comprise calcium borate, strontium borate and/or barium borate and/or the softening particles comprise calcium phosphate, strontium phosphate and/or barium phosphate. Such softening particles have a relatively high coefficient of transmission for visible light. Moreover, low-pressure mercury vapor discharge lamps with a luminescent layer comprising such softening particles have a good maintenance.

In a further preferred embodiment of the low-pressure mercury vapor discharge lamp according to the invention, the softening particles comprise lanthanum borate, cerium borate and/or gadolinium borate, and/or the softening particles comprise lanthanum phosphate, cerium phosphate and/or gadolinium phosphate. Such softening particles have a relatively high coefficient of transmission for ultraviolet radiation and visible light. It has further been found that softening particles comprising lanthanum borate or gadolinium borate or comprising cerium phosphate or gadolinium phosphate have a good adhesion with the inner wall of the discharge vessel.

Very suitable softening particles are strontium borate, barium borate, yttrium borate, yttrium-strontium borate which can be combined with other materials with a higher melting point such as for example Alumina or calcium pyrophosphate.

A preferred embodiment of the low-pressure mercury vapor discharge lamp according to the invention is characterized in that the protective layer comprises a borate and/or a phosphate of an alkaline earth metal and/or a borate and/or a phosphate of scandium, yttrium or a further rare earth metal. Such a protective layer gives a further enhancement of the bonding of the fluorescent layer to the glass wall of the discharge vessel. In a preferred embodiment of the low-pressure mercury vapor discharge lamp according to the invention, the protective layer comprises yttrium oxide or aluminum oxide. Yttrium oxide and aluminum oxide, for example Alon-C, for use as a protective coating in low-pressure mercury vapor discharge lamps is known in the art. Low-pressure mercury vapor discharge lamps with such a protective layer have a good maintenance.

In a preferred embodiment of the low-pressure mercury vapor discharge lamp according to the invention, the protective layer comprises calcium borate, strontium borate and/or barium borate and/or the protective layer comprises calcium phosphate, strontium phosphate and/or barium phosphate. Such a protective layer has a relatively high coefficient of transmission for visible light. Moreover, low-pressure mercury vapor discharge lamps with such a protective layer provide that the phosphor layer has a good adhesion to the pre-coat an improved maintenance.

In a further preferred embodiment of the low-pressure mercury vapor discharge lamp according to the invention, the protective layer comprises lanthanum borate, cerium borate and/or gadolinium borate and/or the protective layer comprises lanthanum phosphate, cerium phosphate and/or gadolinium phosphate. Such a protective layer has a relatively high coefficient of transmission for ultraviolet radiation and visible light. It has further been found that a protective layer comprising lanthanum borate or gadolinium borate or comprising cerium phosphate or gadolinium phosphate have a good adhesion with the inner wall of the discharge vessel and the phosphor layer thus also improving the maintenance. The protective layer in the low-pressure mercury-vapor discharge lamp in accordance with the invention further satisfies the requirements with respect to light and radiation transmissivity and can be easily provided as a very closed and homogeneous protective layer on an inner wall of a discharge vessel of a low-pressure mercury vapor discharge lamp. This is effected, for example, by rinsing the discharge vessel with a solution of a mixture of suitable metal-organic compounds (for example, acetonates or acetates, for example, scandium acetate, yttrium acetate, lanthanum acetate or gadolinium acetate mixed with calcium acetate, strontium acetate or barium acetate) and boric acid or phosphoric acid diluted in water, while the desired protective layer is obtained after drying and sintering.

In practical embodiments of the low-pressure mercury vapor discharge lamp, said protective layer has a thickness of approximately 5 nm to approximately 2 μm. At a layer thickness of more than 2 μm, excessive absorption of the radiation generated in the discharge space takes place. At a layer thickness of less than 5 nm, there is interaction between the discharge and the wall of the discharge vessel. Such layer thicknesses are customarily obtained by means of optical measurements. A layer thickness in the range from approximately 50 nm to approximately 200 nm is particularly suitable. In said preferred range, the protective layer has a relatively high reflectivity in the wavelength range around 254 nm.

These and other aspects of the invention will be apparent from and elucidated with reference to the embodiments described hereinafter.

In the drawings.

The Figures are purely diagrammatic and not drawn to scale. Particularly for clarity, some dimensions are exaggerated strongly. Similar components in the Figures are denoted by the same reference numerals as much as possible.

Figure 1A:
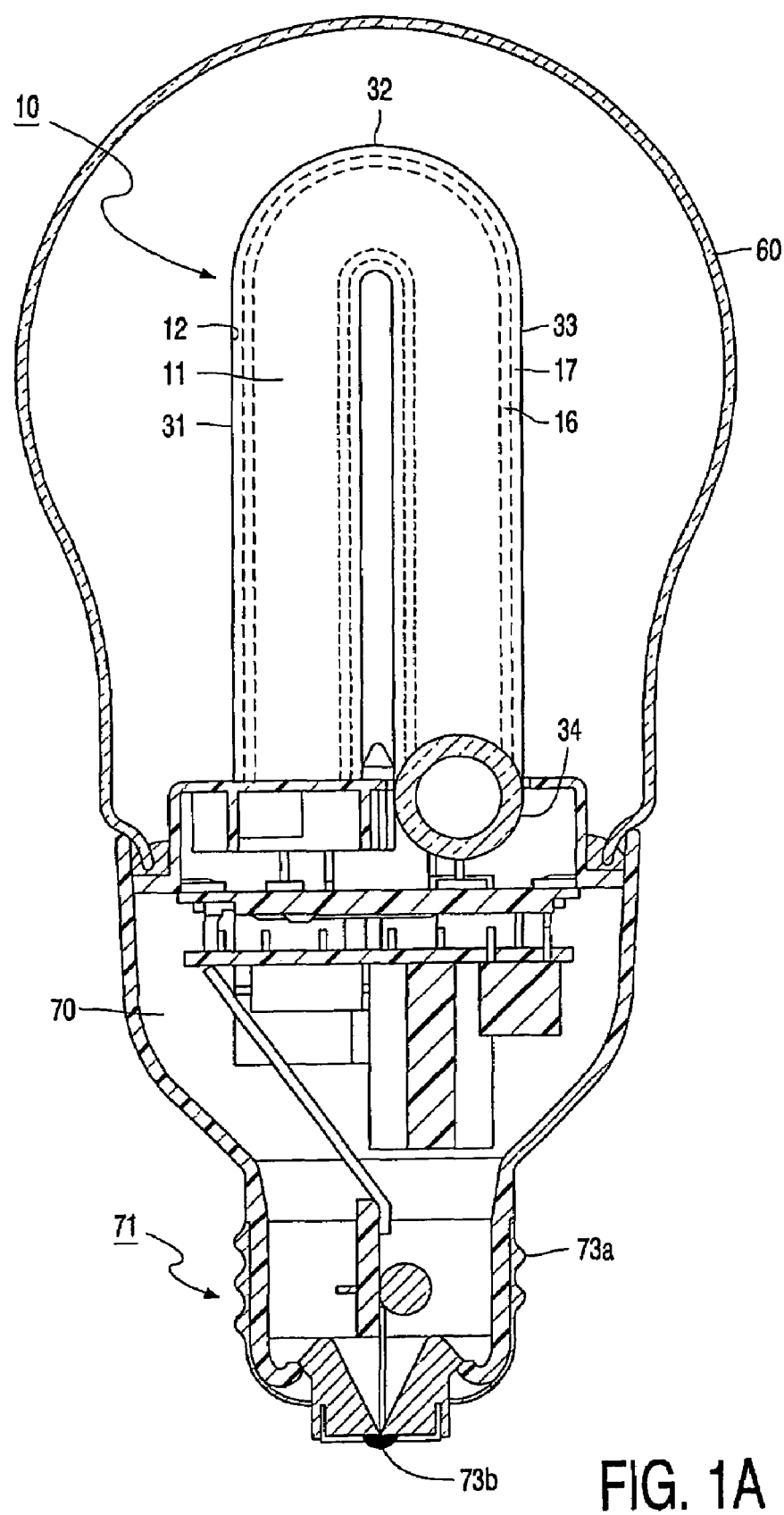
FIG. 1A is a cross-sectional view of an embodiment of a compact fluorescent lamp comprising a low-pressure mercury vapor discharge lamp according to the invention.

FIG. 1A schematically shows a compact fluorescent lamp comprising a low-pressure mercury vapor discharge lamp.

The low-pressure mercury-vapor discharge lamp is provided with a radiation-transmitting discharge vessel 10 enclosing, in a gastight manner, a discharge space 11 having a volume of approximately 10 cm$^3$. The discharge vessel 10 is a glass tube which is at least substantially circular in cross-section and the (effective) internal diameter of which is approximately 10 mm. The tube is bent in the form of a so-called hook and, in this embodiment, it has a number of straight parts, two of which, referenced 31, 33, are shown in FIG. 1A. The discharge vessel further comprises a number of arc-shaped parts, two of which, referenced 32, 34, are shown in FIG. 1A. An inner wall 12 of the discharge vessel 10 is provided with a protective layer 16 and with a luminescent layer 17 comprising a luminescent material. The discharge vessel 10 is supported by a housing 70 which also supports a lamp cap 71 provided with electrical and mechanical contacts 73a, 73b, which are known per se. The discharge vessel 10 of the low-pressure mercury-vapor discharge lamp is surrounded by a light-transmitting envelope 60 which is attached to the lamp housing 70. The light-transmitting envelope 60 generally has a matt appearance.

Figure 1B:
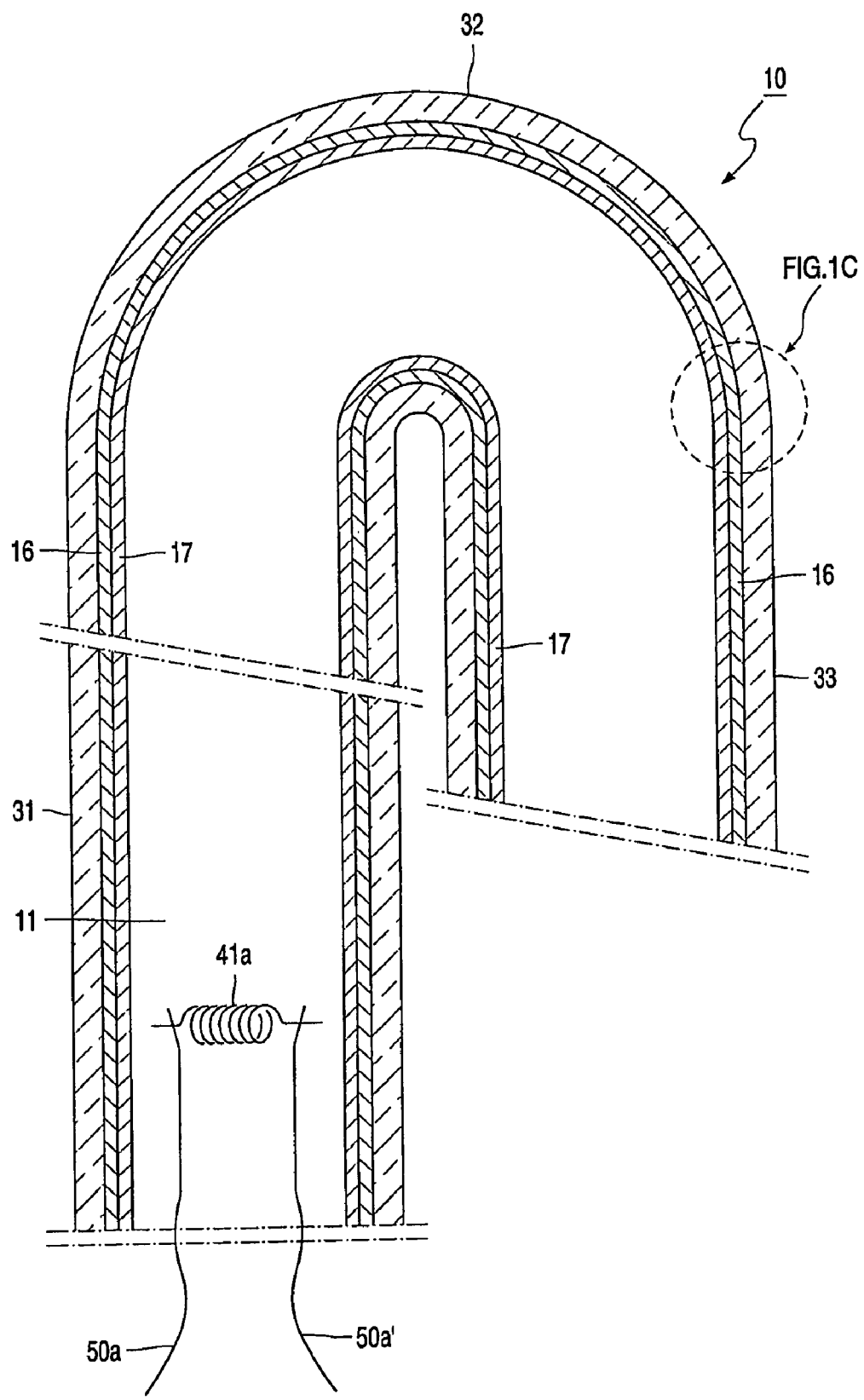
FIG. 1B is a cross-sectional view of a detail of the low-pressure mercury vapor discharge lamp as shown in FIG. 1A.

FIG. 1B very diagrammatically shows a cross-sectional view of a detail of the low-pressure mercury-vapor discharge lamp shown in FIG. 1A. The discharge space 11 in the discharge vessel 10 does not only comprise mercury but also a rare gas, argon in this example. Means for maintaining a discharge are constituted by an electrode pair 41a (only one electrode is shown in FIG. 1B) which is arranged in the discharge space 11. The electrode pair 41a is a winding of tungsten coated with an electron-emissive material, here a mixture of barium oxide, calcium oxide and strontium oxide. Each electrode 41a is supported by an (indented) end portion of the discharge vessel 10 (not shown in FIGS. 1A and 1B). Current supply conductors 50a, 50a' issue from the electrode pair 41a through the end portions of the discharge vessel 10 to the exterior. The current supply conductors 50a, 50a' are connected to an (electronic) power supply which is accommodated in the housing 70 and electrically connected to the electrical contacts 73b at the lamp cap 71 (see FIG. 1A).

An alternative embodiment of the discharge lamp in accordance with the invention comprises so-called electrodeless discharge lamps, in which the means for maintaining an electric discharge are situated outside a discharge space surrounded by the discharge vessel. Generally said means are formed by a coil provided with a winding of an electric conductor, with a high-frequency voltage, for example having a frequency of approximately 3 MHz, being supplied to said coil, in operation. In general, said coil surrounds a core of a soft-magnetic material.

Figure 1C:
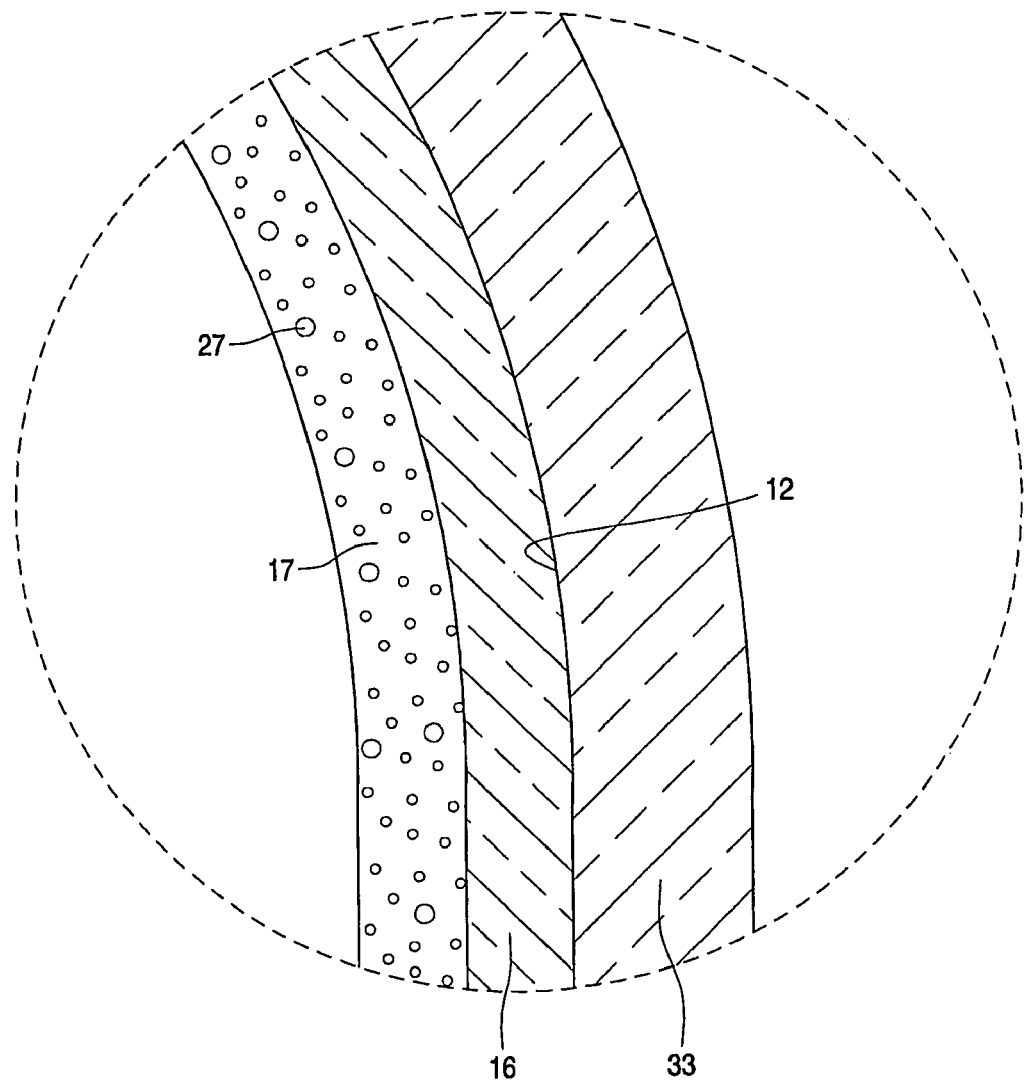
FIG. 1C is a cross-sectional view of a detail of the wall of the discharge vessel as shown in FIG. 1B.

FIG. 1C very diagrammatically shows a cross-sectional view of a detail of the wall of the discharge vessel 10 as shown in FIG. 1B. The inner wall 12 of the discharge vessel 10 is provided with a protective layer 16 and with a luminescent layer 17 comprising a luminescent material. According to the invention, the luminescent layer 17 further comprises inorganic softening particles 27 with a softening point above 450° C. The size of the softening particles 27 is in the range from 0.01 to 10 μm. Preferably, the size of the softening particles 27 is in the submicron range, preferably in the range from 0.01 to 1 μm. The inventors have found that the average particle size of the softening particles 27 and a relatively narrow distribution of the particle size of the softening particles 27 play an important role in the softening properties of the material. Materials with smaller particles lead to a lower melting point of the material. In addition, a smaller size is favorable for the lower content of material needed to prevent powder off of the fluorescent layer.

Generally speaking, the sintering of the fluorescent layer during the manufacture of the discharge vessel of the low-pressure mercury vapor discharge lamp takes place at temperatures in the range from approximately 500° C. to approximately 600° C. In this temperature range the binder in the fluorescent layer is removed after coating the phosphor-liquid onto the inner wall of the discharge vessel. For discharge lamps in which the bended parts are formed subsequent to coating the fluorescent layer, the manufacturing of the arc-shaped parts of the discharge vessel takes place at temperatures between approximately 700° C. and approximately 800° C. while softening the glass wall of the discharge vessel. If the softening material is not softened at this operation temperature, the luminescent layer is not capable of maintaining the bonding with the glass vessel and is thus peeled.

The application of inorganic softening particles in the fluorescent layer is particularly advantageous for the arc-shaped parts of the discharge vessel. A softening point of the softening particles above 450° C., preferably around and above 600° C., improves the adhesion of the fluorescent layer in particular in the arc-shaped parts of the discharge vessel.

The composition of the softening particles is selected such that the material is insoluble in solvents. By properly selecting the material (and the size and the size distribution) of the softening particles, the adhesion of the fluorescent layer to the pre-coat or glass wall of the discharge vessel can be influenced.

Several material parameters have been tested. First of all, the effect of these parameters on the effectiveness to prevent powder-off is studied. The various softening materials have been added to the phosphor suspension in 0.1, 0.5, 1 and 2 wt. % with respect to the solid content of the luminescent material. The size of the particles of the materials added to the luminescent layer is small enough to provide an excellent adhesion of the luminescent layer onto the glass in the straight parts of the discharge vessel as well as in the arc-shaped parts of the discharge vessel.

A number of low-pressure mercury vapor discharge lamps have been manufactured. The protective layer and the luminescent layer are both applied by down flushing in the discharge vessel. Subsequently, the layers are sintered in a furnace around 600° C. in air. In general, employing softening particles with a relatively small size of the particles (between 0.1 and 1 μm) is much more effective than employing the same materials with coarser particle size. It was observed that for softening particles with a relatively small particle size distribution the powder off is substantially reduced. On a scale ranging from "0" meaning "no powder off" to "10" meaning "full powder off", it is observed that for the arc-shaped parts of low-pressure mercury vapor discharge lamps provided with a luminescent layer with softening particles according to the invention the adhesion is "0" whereas as in the arc-shaped parts of the known low-pressure mercury vapor discharge lamp provided with a luminescent layer without softening particles the adhesion is "8". In addition, the run-up time of the low-pressure mercury vapor discharge lamps provided with a luminescent layer with softening particles according to the invention is in the range from 50 to 60 s whereas the run-up time of the known low-pressure mercury vapor discharge lamp provided with a luminescent layer without softening particles the adhesion is in the range from 60 to 70 s.

Maintenance results measured over 2000 hours of various low-pressure mercury vapor discharge lamps were obtained. Table I summarizes the results. From Table I it can be concluded that the maintenance of low-pressure mercury vapor discharge lamps provided with a luminescent layer with softening particles according to the invention is substantially better than that of the known low-pressure mercury vapor discharge lamps provided with a luminescent layer without softening particles.

TABLE 1

Adhesion of the phosphor particles in the bends (Delight)

| Softening particle. | 3 × 150 | 3 × 125 | 3 × 100 | 3 × 80 | total (mg) |
|---|---|---|---|---|---|
| $SrB_4O_7$ 0.5 wt % | 0 | 10 | 5 | 23 | 38 |
| $SrB_4O_7$ 1 wt. % | 0 | 15 | 5 | 10 | 30 |
| $SrB_4O_7$ 2.0 wt. % | 0 | 7 | 5 | 1 | 13 |
| 0.1% alon-C(ref) | 50 | 24 | 10 | 22 | 106 |

TABLE 2

Adhesion improvement in straight part of the bulb (delight)

| | | Adhesion | | |
|---|---|---|---|---|
| | | blow-off | Klepper | |
| | | (mbar) | (3 × position3) | (3 × position5) |
| Sr-borate | 0.5% | 240 | 0 | 1 |
| Sr-borate | 1.5% | 427 | 0 | 1 |
| Ba-borate | 0.5% | 361 | 1 | 1 |
| Ba-borate | 1.5% | 634 | 0 | 0 |
| Alon-C | 0.1% | 130 | 2 | 5 |

TABLE I

Maintenance of various low-pressure mercury vapor discharge lamps provided with a luminescent layer with softening particles according to the invention as compared to a luminescent layer without softening particles.

| | Maintenance (%) | |
|---|---|---|
| hours | luminescent layer with softening particles according to the invention | known luminescent layer no softening particles |
| 100 | 100 | 100 |
| 500 | 97.7 | 96.0 |

Run-up at 100 hours) invention 50-60 sec. And known 60-70 sec.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A low-pressure mercury vapor discharge lamp comprising:
    a light-transmitting discharge vessel having inner wall for enclosing, in a gastight manner, a discharge space provided with a filling of mercury and a rare gas,
    the discharge vessel comprising:
    discharge means for maintaining a discharge in the discharge space;
    a protective layer for covering at least a part of the inner wall of the discharge vessel; and
    a luminescent layer covering the protective layer and having a luminescent material and inorganic softening particles with a softening point above 450° C.,
    wherein a size of the softening particles is in a range from 0.01 to 10 μm.

2. The low-pressure mercury vapor discharge lamp as claimed in claim 1, wherein the softening particles are selected from at least one of a borate, a phosphate of an alkaline earth metal, and a phosphate of at least one of scandium, lanthanum, yttrium and a further rare earth metal.

3. The low-pressure mercury vapor discharge lamp as claimed in claim 2, wherein the softening particles comprise a phosphate of an alkaline earth metal and wherein the alkaline earth metal is selected from one of calcium, strontium, and barium.

4. The low-pressure mercury vapor discharge lamp as claimed in claim 2, wherein the softening particles comprise a phosphate of a further rare earth metal and wherein the further rare earth metal is selected from at least one of lanthanum, cerium, and gadolinium.

5. The low-pressure mercury vapor discharge lamp as claimed in claim 1, where the softening particles are selected from at least one of strontium borate, barium borate, yttrium borate, yttrium-strontium borate and calcium pyrophosphate.

6. The low-pressure mercury vapor discharge lamp as claimed in claim 1, wherein the size of the softening particles is in the range from 0.01 to 1 μm.

7. The low-pressure mercury vapor discharge lamp as claimed in claim 1, wherein the softening particles have a melting point above 600° C.

8. The low-pressure mercury vapor discharge lamp as claimed in claim 1, wherein the protective layer comprises yttrium oxide or aluminum oxide.

9. The low-pressure mercury vapor discharge lamp as claimed in claim 1, wherein the protective layer comprises:
    at least one of a borate, a phosphate of an alkaline earth metal,
    a phosphate of scandium, yttrium and a further rare earth metal.

10. The low-pressure mercury vapor discharge lamp as claimed in claim 9, wherein the protective layer comprises a phosphate of an alkaline earth metal and wherein the alkaline earth metal is selected from at least one of calcium, strontium, and barium.

11. The low-pressure mercury vapor discharge lamp as claimed in claim 9, wherein the protective layer comprises a phosphate of scandium or yttrium and a further rare earth metal and wherein the further rare earth metal is selected from at least one of lanthanum, cerium, and gadolinium.

12. The low-pressure mercury-vapor discharge lamp as claimed in claim 1, further comprising:
    a lamp housing attached to the discharge vessel; and
    a lamp cap attached to the lamp housing.

13. The low-pressure mercury-vapor discharge lamp as claimed in claim 1, wherein the luminescent layer comprises a phosphor suspension and wherein the softening particles are added to the phosphor suspension in 0.1 wt. % with respect to a solid content of the luminescent layer.

14. The low-pressure mercury-vapor discharge lamp as claimed in claim 1, wherein the luminescent layer comprises a phosphor suspension and wherein the softening particles are added to the phosphor suspension in 0.5 wt. % with respect to a solid content of the luminescent layer.

15. The low-pressure mercury-vapor discharge lamp as claimed in claim 1, wherein the luminescent layer comprises a phosphor suspension and wherein the softening particles are added to the phosphor suspension in 1.0 wt. % with respect to a solid content of the luminescent layer.

16. The low-pressure mercury-vapor discharge lamp as claimed in claim 1, wherein the luminescent layer comprises a phosphor suspension and wherein the softening particles are added to the phosphor suspension in 2.0 wt. % with respect to a solid content of the luminescent layer.

17. The low-pressure mercury-vapor discharge lamp as claimed in claim 1, wherein the discharge vessel comprises at least one arc-shaped portion joined to at least one straight portion.

\* \* \* \* \*